US006604148B1

(12) United States Patent
Dennison

(10) Patent No.: US 6,604,148 B1
(45) Date of Patent: Aug. 5, 2003

(54) METHOD, SYSTEM, AND PROGRAM FOR ACCESSING A NETWORK NAMESPACE

(75) Inventor: Carl Michael Dennison, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,610

(22) Filed: Oct. 1, 1999

(51) Int. Cl.[7] ............................................. G06F 15/16
(52) U.S. Cl. ............................ 709/245; 707/3; 707/10; 709/223; 709/316
(58) Field of Search ................................. 709/245, 223, 709/201, 316; 707/3, 10, 201

(56) References Cited

U.S. PATENT DOCUMENTS

| | | | | |
|---|---|---|---|---|
| 5,179,637 A | | 1/1993 | Nardozzi | 358/1.15 |
| 5,287,194 A | | 2/1994 | Lobiondo | 358/296 |
| 5,452,459 A | * | 9/1995 | Drury et al. | 707/3 |
| 5,483,652 A | * | 1/1996 | Sudama et al. | 707/10 |
| 5,580,177 A | | 12/1996 | Gase et al. | 400/61 |
| 5,692,180 A | * | 11/1997 | Lee | 707/10 |
| 5,832,191 A | | 11/1998 | Thorne | 358/1.15 |
| 5,893,116 A | * | 4/1999 | Simmonds et al. | 707/201 |
| 6,052,720 A | * | 4/2000 | Traversat et al. | 709/220 |
| 6,112,235 A | * | 8/2000 | Spofford | 709/223 |
| 6,175,878 B1 | * | 1/2001 | Seaman et al. | 709/201 |
| 6,360,230 B1 | * | 3/2002 | Chan et al. | 709/316 |

FOREIGN PATENT DOCUMENTS

| | | |
|---|---|---|
| EP | 0631232 | 12/1994 |
| WO | 9714098 | 4/1997 |

OTHER PUBLICATIONS

IBM Technical Disclosure Bulletin, "Palladium Use of the Distributed Computing Environment Name Space", vol. 36, No. 8, Aug. 1993, pp. 187–188.
"Telephone and Radio", Communications International, vol. 10, No. 8, pp. 34–8 (Abstract).
International Journal Research Disclosure No. 409, "DFS As An Internet File System", May 1998.
International Journal Research Disclosure No. 414. "Using a Generic Shared Filesystem for a Client/Server Namespace", Oct. 1998.

* cited by examiner

Primary Examiner—Kenneth R. Coulter
Assistant Examiner—Hai V. Nguyen
(74) Attorney, Agent, or Firm—David W. Victor; Konrad Raynes Victor & Mann LLP

(57) ABSTRACT

Disclosed is a method, system, and program for accessing an object in a network providing communication among multiple network devices and a namespace server including a namespace comprising one network address, e.g., IP address, for each network device in the system. The network device retrieves the namespace from the namespace server over the network and maintains the retrieved namespace as a local namespace at the network device. The network device may then determine the network address of a target network device to use to send a request to the network address of the target network device.

27 Claims, 3 Drawing Sheets

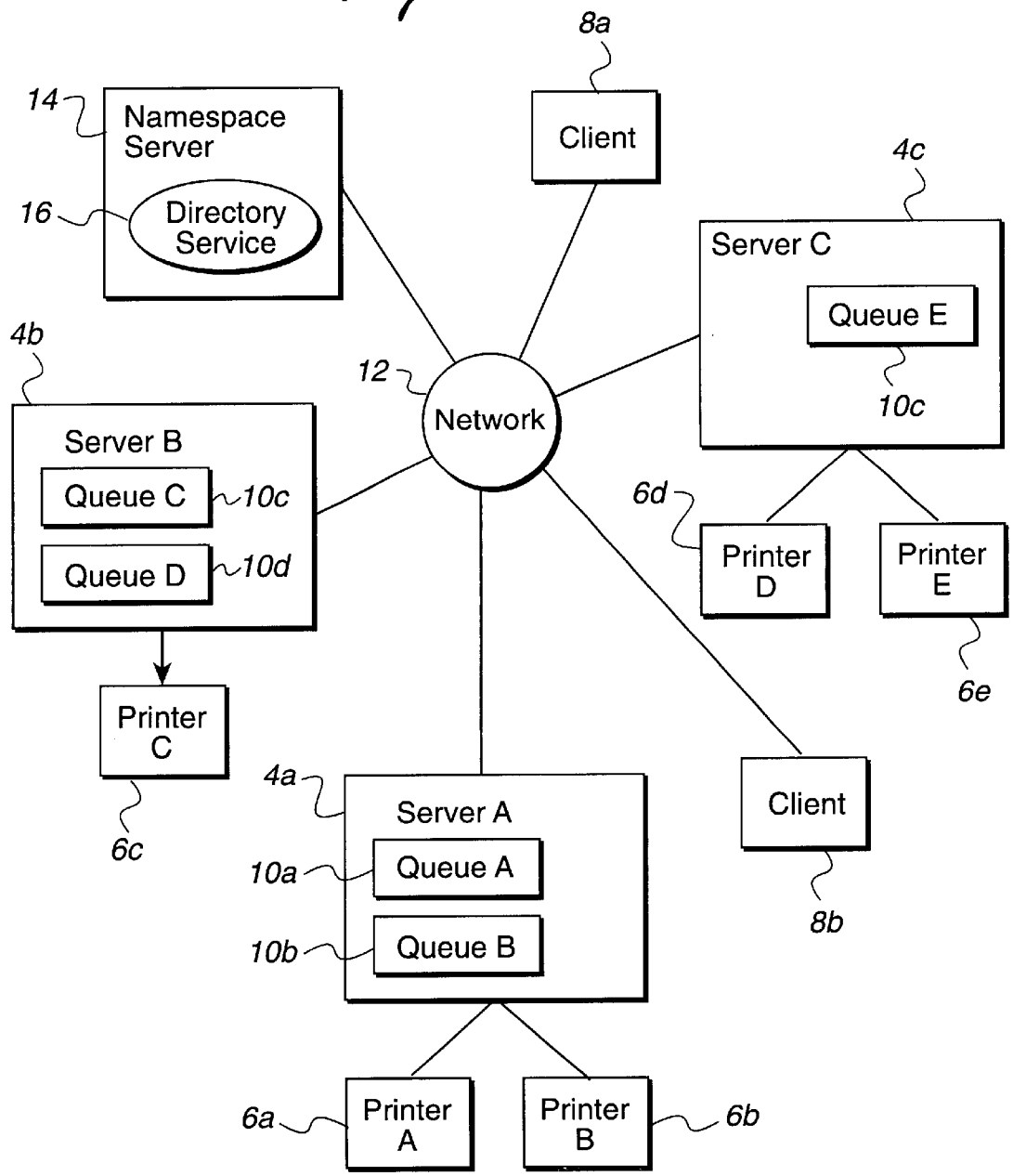

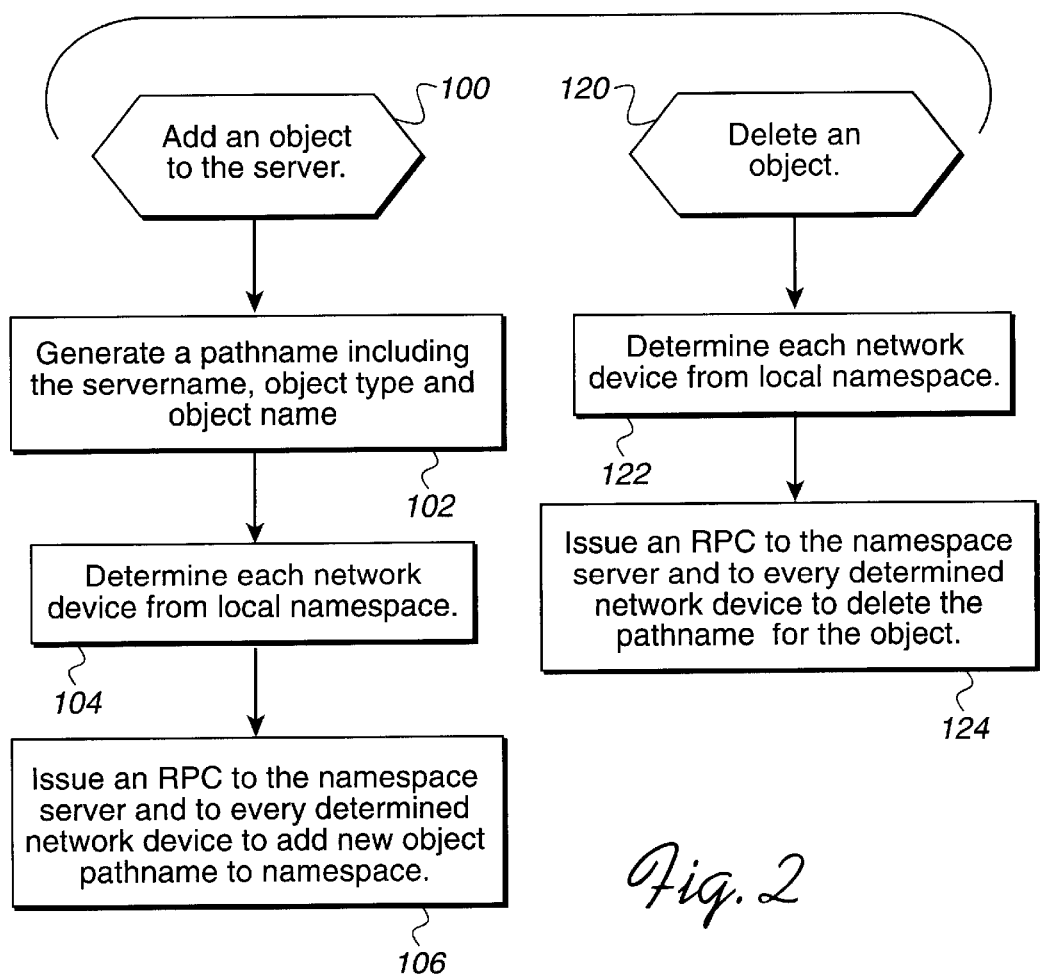

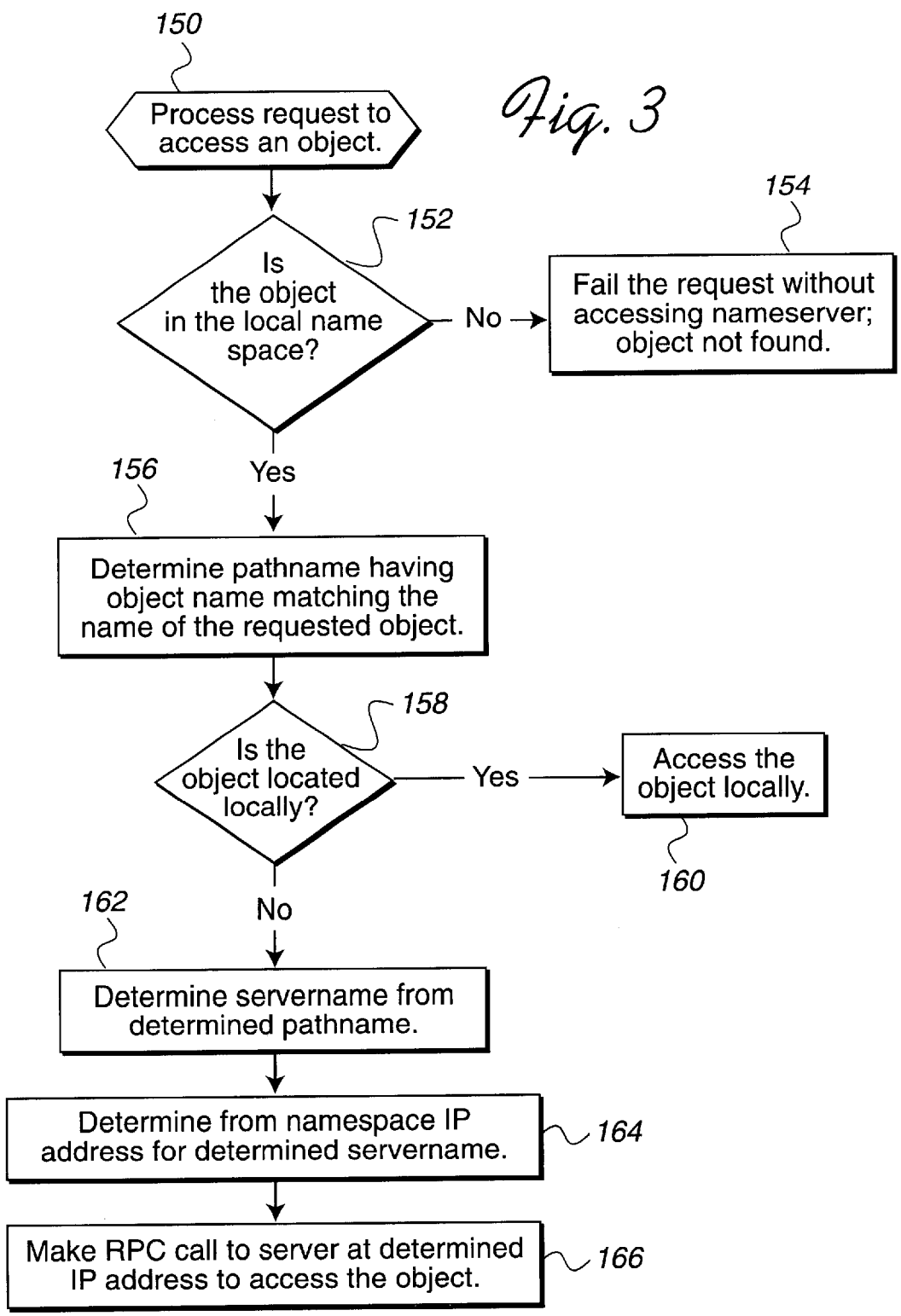

METHOD, SYSTEM, AND PROGRAM FOR ACCESSING A NETWORK NAMESPACE

BACKGROUND OF THE INVENTION

1. Field of the Invention

The present invention relates to a method, system, and program for accessing a namespace indicating the location of network devices and objects in a network environment.

2. Description of the Related Art

Network printing systems generally comprise an assemblage of different printers, client computers, servers, and other components connected over a network. A print job is assembled at a client computer and transmitted over the network to a server linked to a variety of printers. To route print jobs through a network printing system, International Business Machines Corporation (IBM) provides Printing Systems Manager (PSM) and InfoPrint products that provide centralized and distributed management of a network printing system.** The PSM and InfoPrint printer manager software manages the flow of print jobs and ensures that a print job is routed to a printer that can handle the job. These printer manager software products manage both printer and queue objects. Queue objects represent queues of print jobs and the printer objects include both logical and physical print objects representing the managed.

**AIX and OS/2 are registered trademarks of IBM; Unix is a registered trademark licensed exclusively by the X/Open Company LTD.; WINDOWS is a registered trademark of Microsoft Corporation; and Linux is a trademark of Linus Torvalds.

Because printer, queue, and spooler resources are distributed at different resources, a global name repository, referred to as a namespace, provides the mapping of printer objects to servers and from the servers to network IP addresses. The namespace is available to all utilities and API procedures within the network printing system. The namespace allows procedures to access a server in the distributed network environment without having to know the physical location of the server. Thus, a system in the network can share a resource by including it in the namespace. In the IBM PSM server, the namespace is implemented using the Distributed Computing Environment (DCE) Directory Service.

In the current art, the namespace is maintained on a namespace server. DCE provides a name service that administers the namespace and returns mappings of an object name to a namespace object name. Binding is the process by which a network device or procedure determines the location of the object in the network. The namespace provides a mapping of servers to IP addresses and the name of objects and interfaces. The name of objects is in a pathname format, which includes the server name, the type of object, and the name of the object. For instance, a printer object may include the following components in the pathname:

/.../servename/printer/printername

When the client wants to access an object, the client would send a request for the object name over the network to the namespace server to obtain the binding information. This namespace server would return the full object pathname, including the name of the server containing the object. The client would then extract the server name from the object pathname and then send a second request over the network to the namespace server for the IP address of the server including the object. Only after obtaining this binding information by making two calls to the namespace server may the client then establish communication with the server to access the object therein. Further details of the PSM namespace is described in the IBM publication "Administrating IBM Printing Systems Manager for AIX Version 1.2.1," IBM document no. S544-3964-02 (IBM Copyright, 1996), which publication is incorporated herein by reference in its entirety. Details of the DCE namespace are described in the IBM publication "Administrating IBM Printing Systems Manager for AIX Version 1.2.1," IBM document no. S544-3964-02 (IBM Copyright, 1996), which publication is incorporated herein by reference in its entirety.

SUMMARY OF THE PREFERRED EMBODIMENTS

To overcome the limitations in the prior art described above, preferred embodiments disclose a method, system, and program for accessing an object in a network providing communication among multiple network devices and a namespace server including a namespace comprising one network address for each network device in the system. The network device retrieves the namespace from the namespace server over the network and maintains the retrieved namespace as a local namespace at the network device. The network device may then determine the network address of a target network device to use to send a request to the network address of the target network device.

In further embodiments, the namespace includes a plurality of objects and a network device through which the object is capable of being accessed. One network device processes a request to access one of the objects and then locates the requested object in the local namespace. The network device determines from the located object in the local namespace the network device and the network address of the network device through which the object is capable of being accessed. The network device then transmits a request to access the object to the determined network address of the network device through which the object is capable of being accessed In still further embodiments, a network device may add or delete an object The network device adding or deleting the object would determine from its local namespace the network address of every other network device and then transmit information on the added or deleted object to every other determined network device and the namespace server. The network devices receiving the transmitted information use the information on an added object to determine the location of the added object in the network.

With preferred embodiments network devices do not need to access a separate server including the namespace over the network to determine the network IP address of another network device or object. Preferred embodiments provide a mechanism for making the namespace available locally at each network device and updating the local namespaces so the local namespaces are current and consistent with the central namespace on the namespace server. With the preferred embodiment technique for accessing the namespace, network traffic is reduced significantly because network devices do not need to issue multiple requests to a remote namespace server to determine the location in the network of an object or device. Preferred embodiments improve the scalability of network systems because addition of further network objects and devices does not require corresponding increases in network traffic to determine the location of the added objects and devices in the network.

BRIEF DESCRIPTION OF THE DRAWINGS

Referring now to the drawings in which like reference numbers represent corresponding parts throughout:

FIG. 1 is a block diagram illustrating a network computing environment in which preferred embodiments of the present invention are implemented;

FIG. 2 illustrates logic implemented in the network devices to add and delete network objects in accordance with preferred embodiments of the present invention; and FIG. 3 illustrates logic implemented in the network devices to determine the location of a network object in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

FIG. 1 illustrates a distributed printing environment in which preferred embodiments of the present invention are implemented. A plurality of servers 4a, b, c manage control to printers 6a, b, c, d, and e. Clients 8a and b may submit print jobs to a printer 6a, b, c, d or a printer queue 10a, b, c, d or e, which queues and schedules print jobs to print at the attached printer. The servers 6a, b, c, d may include the IBM InfoPrint or Printing Systems Manager (PSM) printer management software and a UNIX based operating system, such as the IBM AIX operating system to queue print jobs and manage printer operations such as scheduling and spooling.** The servers 4a, b, c, printers 6a, b, c, d, and clients 8a, b communicate over network 12, which may comprise any network known in the art, such as LAN, Ethernet, WAN, System Area Network (SAN), Token Ring, Internet, Intranet, etc., using a network protocol such as TCP/IP.

**AIX and OS/2 are registered trademarks of IBM; Unix is a registered trademark licensed exclusively by the X/Open Company LTD.; WINDOWS is a registered trademark of Microsoft Corporation; and Linux is a trademark of Linus Torvalds.

A namespace server 14 provides global name repository for the devices and objects within the network printing system 2. The namespace server 14 includes a directory service 16, such as the DCE directory service, to provide binding information to clients 8a, b or other systems needing binding address information to submit a request to a network device in the system. The namespace server 14 provides the IP address for each server 4a, b, c and the pathname of each queue 10a, b, c, d, e and printer 6a, b, c, d, e object in the system. The pathnane name for a printer would include in the pathname of the object the following name components (1) below:

/Servername/Printer/Printername    (1)

The Servername indicates the name of the server 4a, b, c, e.g., Server A, Server B, Server C, which manages control of the printer 6a, b, c, d, e having printername, e.g., Printer A, Printer B, etc. The second level of the printer pathname indicates that the object is a printer. Clients and processes in the network 2 requesting access to the printer only need to present the printer name to access a printer and the namespace is used to convert the name to a network location.

Similarly, the pathname for an object, such as a queue, may include the following name component in the pathname shown in (2) below.

/Servername/Queue/Queuename    (2)

As with the printer pathname, the Servername indicates the name of the server 4a, b, c, e.g., Server A, Server B, Server C, which manages control of the queue 10a, b, c, d, e having queuename, e.g., Queue A, Queue B, etc. The second level of the queue pathname indicates that the object is a queue.

The pathnames may include additional name components, such as path location information, associated logical and physical printers, name of DCE cell, etc.

To avoid the network traffic associated with determining the physical location of an object or a server, preferred embodiments maintain a copy of the namespace at each network device, e.g., server 4a, b, c and client 8a, b, c computer, accessing the network 2 as a local namespace. Upon initialization, each client 8a, b and server 4a, b, c entity in the network 2 will make a Remote Procedure Call (RPC) to the namespace server 14 to obtain all the mappings from devices, e.g., clients and servers, to IP addresses, and the list of pathnames for all objects in the network 2. In preferred embodiments, the network devices maintain the local namespace in memory for quick access. However, in alternative embodiments, the network devices may maintain some or all of the local namespace in disk storage and swap portions of the local namespace from disk to memory as needed. The RPC is a facility for calling a procedure on a remote machine as if it were a local procedure call. RPC provides a security routine to verify that the remote machine attempting to run the local procedure has authority to perform the operation, e.g., access the namespace.

FIG. 2 illustrates logic implemented in any network device, typically a server 4a, b, c when modifying the arrangement of objects and devices in the network 2. At block 100, a server 4a, b, c creates a new object, such as a logical printer, queue, etc. To make the object available to other procedures in the network 2, the creator of the object generates (at block 102) a pathname including its name, i.e., Servername, the type of object, e.g., printer, queue, and the specific name of the object. The server 4a, b or c creating the object then processes its local namespace, which it accessed during initialization, and determines (at block 104) each network device from the list of machines and IP addresses. The server 4a, b, c then issues (at block 106) an RPC call to update the namespace server 14 and every other network device, e.g., client 8a, b and server 4a, b, c, with information on the new object, including the pathname of the new object. Upon receiving information on the new object, each network device would update its local namespace to include the pathname for the new object.

At block 120, a server 4a, b, or c deletes an object. After deleting the object, the server 4a, b or c notifies the namespace server 14 and every other network device of the removal of the object. In response, each notified network device updates its local namespace to remove the deleted object. Other modifications to objects could also be changed in each local namespace.

With the preferred embodiments, during initialization, the network devices will access the most recent version of the namespace from the namespace server 14 to store locally. In alternative embodiments, the network devices may query the namespace server after initialization to obtain the central version of the namespace at the namespace server.

FIG. 3 illustrates logic implemented within a network device for accessing an object using the local nanespace in accordance with preferred embodiments. Control begins at block 150 with a network device, e.g., client or server, processing a request to access an object. The request may be from within a local process running in the network device. The network device determines (at block 152) whether the object name is in the local namespace, i.e., matches the object name of one object pathname in the local namespace.

If not, then the network device (at block 154) fails the request without accessing the nameserver and returns an "object not found" message. Otherwise, if the object name is in the local namespace, then the network device determines (at block 156) the pathname having an object name matching the name of the requested object. If (at block 158) the object is located locally with respect to the network device, either within the network device or an attached peripheral to the device, then the network device accesses (at block 160) the object locally. Otherwise, if the requested object is at a remote network device, then the network device determines (at block 162) the Servername from the determined pathname. The network device then processes (at block 164) the mapping of servers to IP addresses within the local namespace to determine the IP address of the servername of the network device including the object. The device then issues (at block 166) an RPC call to the server at the IP address requesting the object.

Preferred embodiments provide a method, system, and program for allowing a network device to determine the IP address of an object from a locally maintained namespace instead of having to issue two network requests to the namespace server to determine the IP address of where the desired object is located. Thus, preferred embodiments reduce network traffic and provide for faster processing of object requests by providing local copies of the namespace that are updated with any changes to ensure that the local namespace remains current.

Moreover, preferred embodiments allow for greater scalability without negatively impacting system performance. In the prior art, if more devices and objects are added to the network, then the addition of new objects and devices would result in a corresponding increase in network traffic to the namespace server to locate the object in the network. With the preferred embodiment local namespace system, network traffic does not increase as a result of adding new objects. After all the network devices are updated with namespace information for the new object, the network devices do not need to issue network requests to determine the location of the object because such locations are determined from the local namespace. Thus, preferred embodiments provide for improved scalability to add new objects to the network system.

Conclusions and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a network printing environment and accessing print manager servers in the environment to perform printing operations. However, the preferred embodiments can be applied to any network system, not just printing systems. The only limitation is that as the number of devices and objects are added, the memory space in the network devices, e.g., servers and clients, to maintain the local namespace increases.

Preferred embodiments were described with respect to using the namespace to maintain network address information on servers including network objects. However, the namespace may be used to include network address information for any network device in the system, including servers.

The term network device as used herein refers to a computer, e.g., client or server, in a network. However, the term network device may also refer to a process executing within a computer.

In summary, preferred embodiments disclose a disclose a method, system, and program for accessing an object in a network providing communication among multiple network devices and a namespace server including a namespace comprising one network address for each network device in the system. The network device retrieves the namespace from the namespace server over the network and maintains the retrieved namespace as a local namespace at the network device. The network device may then determine the network address of a target network device to use to send a request to the network address of the target network device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing an object in a network providing communication among multiple network devices and a namespace server including a namespace comprising one network address for each network device in the system, comprising:

retrieving, with at least one network device, the namespace from the namespace server over the network during initialization of the network device;

maintaining, with the at least one network device, the retrieved namespace as a local namespace at the network device; and determining from the local namespace, with one network device, the network address of a target network device to use to send a request to the network address of the target network device.

2. The method of claim 1, wherein the namespace includes a plurality of objects and a network device through which the object is capable of being accessed, further comprising:

processing, with one network device, a request to access one of the objects;

locating, with the network device, the requested object in the local namespace;

determining, with the network device, from the located object in the local namespace the network device and the network address of the network device through which the object is capable of being accessed; and transmitting, with the network device, a request to access the object to the determined network address of the network device through which the object is capable of being accessed.

3. The method of claim 2, wherein the namespace includes for each object a pathname indicating an object name and a name of the server through which the object is capable of being accessed, wherein locating the requested object in the local namespace comprises determining the pathname in the local namespace having the object name matching the name of the requested object, and wherein determining from the located object in the local namespace the network device comprises accessing the servername in the determined pathname for the requested object.

4. The method of claim 2, further comprising:

adding, with one network device, one object;

determining from the local namespace, with the network device adding the object, the network address of every other network device; and transmitting, with the network device adding the object, information on the added object to other determined network devices and the namespace server, wherein the network devices receiving the transmitted information use the information on the added object to determine the location of the added object in the network.

5. The method of claim 2, further comprising:

deleting, with one network device, one object;

determining from the local namespace, with the network device deleting the object, the network address of every other network device; and transmitting, with the network device deleting the object, information on the deleted object to every other determined network device and the namespace server.

6. The method of claim 1, wherein the namespace includes a plurality of printer objects representing printers and a network device through which the printer object is capable of being accessed, further comprising:

processing a request to submit a print job to one printer represented as an object in the local namespace;

locating the printer object for the printer to print the print job in the local namespace;

determining from the located printer object in the local namespace the network device and the network address of the network device through which the printer is capable of being accessed; and submitting the print job to the determined network address of the network device through which the printer is capable of being accessed.

7. The method of claim 1, wherein the namespace includes a plurality of queue objects representing queues of print jobs to submit to a printer and a network device through which the queue object is capable of being accessed, further comprising:

processing a request to access a queue represented as a queue object in the local namespace;

locating the requested queue object in the local namespace;

determining from the located queue object in the local namespace the network device and the network address of the network device through which the queue is capable of being accessed; and submitting the request to access the queue to the determined network address of the network device through which the printer is capable of being accessed.

8. A system for accessing an object in a network providing communication among multiple network devices and a namespace server including a namespace comprising one network address for each network device in the system, wherein at least one network device in the network comprises:

means for retrieving the namespace from the namespace server over the network during initialization of the network device;

means for maintaining the retrieved namespace as a local namespace at the network device; and means for determining from the local namespace the network address of a target network device to use to send a request to the network address of the target network device.

9. The system of claim 8, wherein the namespace includes a plurality of objects and a network device through which the object is capable of being accessed, wherein the at least one network device further comprises:

means for processing a request to access one of the objects;

means for locating the requested object in the local namespace;

means for determining from the located object in the local namespace the network device and the network address of the network device through which the object is capable of being accessed; and means for transmitting a request to access the object to the determined network address of the network device through which the object is capable of being accessed.

10. The system of claim 9, wherein the namespace includes for each object a pathname indicating an object name and a name of the server through which the object is capable of being accessed, wherein the means for locating the requested object in the local namespace comprises determining the pathname in the local namespace having the object name matching the name of the requested object, and wherein the means for determining from the located object in the local namespace the network device comprises accessing the servername in the determined pathname for the requested object.

11. The system of claim 9, wherein the at least one network device further comprises:

means for adding one object;

means for determining from the local namespace the network address of every other network device; and means for transmitting information on the added object to other determined network devices and the namespace server, wherein the network devices receiving the transmitted information use the information on the added object to determine the location of the added object in the network.

12. The system of claim 9, wherein the at least one network device further comprises:

means for deleting one object;

means for determining from the local namespace the network address of every other network device; and means for transmitting information on the deleted object to every other determined network device and the namespace server.

13. The system of claim 8, wherein the namespace includes a plurality of printer objects representing printers and a network device through which the printer object is capable of being accessed, wherein the at least one network device further comprises:

means for processing a request to submit a print job to one printer represented as an object in the local namespace;

means for locating the printer object for the printer to print the print job in the local namespace;

means for determining from the located printer object in the local namespace the network device and the network address of the network device through which the printer is capable of being accessed; and means for submitting the print job to the determined network address of the network device through which the printer is capable of being accessed.

14. The system of claim 8, wherein the namespace includes a plurality of queue objects representing queues of print jobs to submit to a printer and a network device through which the queue object is capable of being accessed, wherein the at least one network device further comprises:

means for processing a request to access a queue represented as a queue object in the local namespace;

means for locating the requested queue object in the local namespace;

means for determining from the located queue object in the local namespace the network device and the network address of the network device through which the queue is capable of being accessed; and means for submitting the request to access the queue to the determined network address of the network device through which the printer is capable of being accessed.

15. An article of manufacture for accessing an object in a network providing communication among multiple network devices and a namespace server including a namespace comprising one network address for each network device in the system, the article of manufacture comprising computer usable media including at least one computer program and at least one work process embedded therein that causes at least one network device to perform:

retrieving the namespace from the namespace server over the network during initialization of the network device;

maintaining the retrieved namespace as a local namespace at the network device; and determining from the local namespace the network address of a target network device to use to send a request to the network address of the target network device.

16. The article of manufacture of claim 15, wherein the namespace includes a plurality of objects and a network device through which the object is capable of being accessed, further causing the at least one network device to perform:

processing a request to access one of the objects;

locating the requested object in the local namespace;

determining from the located object in the local namespace the network device and the network address of the network device through which the object is capable of being accessed; and transmitting a request to access the object to the determined network address of the network device through which the object is capable of being accessed.

17. The article of manufacture of claim 16, wherein the namespace includes for each object a pathname indicating an object name and a name of the server through which the object is capable of being accessed, wherein locating the requested object in the local namespace comprises determining the pathname in the local namespace having the object name matching the name of the requested object, and wherein determining from the located object in the local namespace the network device comprises accessing the servername in the determined pathname for the requested object.

18. The article of manufacture of claim 16, further causing the at least one network device to perform:

adding one object;

determining from the local namespace the network address of every other network device; and transmitting information on the added object to other determined network devices and the namespace server, wherein the network devices receiving the transmitted information use the information on the added object to determine the location of the added object in the network.

19. The article of manufacture of claim 16, further causing the at least one network device to perform:

deleting one object;

determining from the local namespace the network address of every other network device; and transmitting information on the deleted object to every other determined network device and the namespace server.

20. The article of manufacture of claim 15, wherein the namespace includes a plurality of printer objects representing printers and a network device through which the printer object is capable of being accessed, further causing the at least one network device to perform:

processing a request to submit a print job to one printer represented as an object in the local namespace;

locating the printer object for the printer to print the print job in the local namespace;

determining from the located printer object in the local namespace the network device and the network address of the network device through which the printer is capable of being accessed; and submitting the print job to the determined network address of the network device through which the printer is capable of being accessed.

21. The article of manufacture of claim 15, wherein the namespace includes a plurality of queue objects representing queues of print jobs to submit to a printer and a network device through which the queue object is capable of being accessed, further causing the network device to perform:

processing a request to access a queue represented as a queue object in the local namespace;

locating the requested queue object in the local namespace;

determining from the located queue object in the local namespace the network device and the network address of the network device through which the queue is capable of being accessed; and submitting the request to access the queue to the determined network address of the network device through which the printer is capable of being accessed.

22. A method for accessing an object in a network providing communication among multiple network devices and a namespace server including a namespace comprising one network address for each network device in the system, comprising:

retrieving, with at least one network device, the namespace from the namespace server over the network;

maintaining, with the at least one network device, the retrieved namespace as a local namespace at the network device;

determining from the local namespace, with one network device, the network address of a target network device to use to send a request to the network address of the target network device;

modifying, with one network device, an arrangement of objects;

determining from the local namespace, with the network device modifying the objects, the network address of every other network device; and transmitting, with the network device modifying the arrangement of objects, information on the modified arrangement to every other determined network device and the namespace server.

23. The method of claim 22, wherein modifying the arrangement of objects comprises one of deleting one object or adding one object.

24. A system for accessing an object in a network providing communication among multiple network devices and a namespace server including a namespace comprising one network address for each network device in the system, comprising:

means for retrieving the namespace from the namespace server over the network;

means for maintaining the retrieved namespace as a local namespace at the network device;

means for determining from the local namespace the network address of a target network device to use to send a request to the network address of the target network device;

means for modifying an arrangement of objects;

means for determining from the local namespace the network address of every other network device; and means for transmitting information on the modified arrangement to every other determined network device and the namespace server.

25. The system of claim 24, wherein the means for modifying the arrangement of objects performs one of deleting one object or adding one object.

26. An article of manufacture for accessing an object in a network providing communication among multiple network devices and a namespace server including a namespace comprising one network address for each network device in the system, wherein the article of manufacture causes at least one network device to perform:

retrieving the namespace from the namespace server over the network;

maintaining the retrieved namespace as a local namespace at the network device;

determining from the local namespace the network address of a target network device to use to send a request to the network address of the target network device;

modifying an arrangement of objects;

determining from the local namespace the network address of every other network device; and transmitting information on the modified arrangement to every other determined network device and the namespace server.

27. The article of manufacture of claim 26, wherein modifying the arrangement of objects comprises one of deleting one object or adding one object.

* * * * *